United States Patent [19]

Schmiterlow

[11] E Re. 28,815

[45] Reissued May 18, 1976

[54] SPRING SUPPORTED RAILWAY VEHICLE

[75] Inventor: Fredrick Schmiterlow, Vasteras, Sweden

[73] Assignee: Allmänna Svenska Elektriska Aktiebolaget, Vasteras, Sweden

[22] Filed: May 9, 1973

[21] Appl. No.: 358,519

Related U.S. Patent Documents

Reissue of:

[64] Patent No.: 3,469,538
Issued: Sept. 30, 1969
Appl. No.: 615,600
Filed: Feb. 13, 1967

[30] Foreign Application Priority Data

Feb. 28, 1966 Sweden ..... 2561/66

[52] U.S. Cl. ..... 105/199 R; 105/199 A; 105/199 F; 267/3

[51] Int. Cl.² ..... B61F 3/08; B61F 5/02; B61F 5/16; B61F 5/24

[58] Field of Search ..... 105/196, 199 F, 199 R, 105/200, 199 A; 267/3, 4

[56] References Cited

UNITED STATES PATENTS

| | | | |
|---|---|---|---|
| 2,954,747 | 10/1960 | Hirst et al. | 105/196 |
| 3,104,622 | 9/1963 | Van Zijp et al. | 105/199 R |
| 3,351,336 | 11/1967 | Blake | 267/3 |
| 3,470,303 | 9/1969 | Lindstrom | 13/20 |
| 3,532,804 | 10/1970 | Virsberg | 174/139 |
| R27,846 | 12/1973 | Virsberg | 174/139 |
| R28,018 | 5/1974 | Lindstrom et al. | 13/20 |

FOREIGN PATENTS OR APPLICATIONS

| | | | |
|---|---|---|---|
| 1,455,085 | 10/1963 | Germany | 105/199 R |
| 630,964 | 7/1963 | Belgium | 105/199 F |
| 805,890 | 5/1951 | Germany | 105/199 F |

*Primary Examiner*—Robert J. Spar
*Assistant Examiner*—Howard Beltran

[57] ABSTRACT

A rail vehicle is carried by two-axled bogies pivoted to it, four shock absorbers only for damping the movements of the body of the vehicle are arranged between the body and each bogie; these are placed on both sides of the transverse and logitudinal axes of the bogie at a relatively great distance from the transverse axis and are arranged at an angle to the horizontal.

1 Claim, 2 Drawing Figures

INVENTOR.
FREDRIK SCHMITERLOW
BY
BAILEY, STEPHENS AND HUETTE
Attorneys

SPRING SUPPORTED RAILWAY VEHICLE

Matter enclosed in heavy brackets [ ] appears in the original patent but forms no part of this reissue specification; matter printed in italics indicates the additions made by reissue.

BACKGROUND OF THE INVENTION

Field of the Invention

The present invention relates to a rail vehicle comprising a carriage body supported by wheel bogies limited for turning and swinging and having several axles, in which between the carriage body and the wheel bogies a number of shock absorbers is arranged to damp the relative movements between carriage body and bogies.

Prior Art

For a rail vehicle to run smoothly and comfortably shock absorbers must be arranged to damp the movement components in the movement of the parts. One differentiates between transverse vertical movement, transverse sideways movement, carriage movement in sideways direction and the carriage movement in longitudinal direction. Corresponding movements also occur in the wheel bogie and also turning movements around the suspension point of the bogie. All these movements should be able to be damped with the help of as few shock absorbers as possible. Previously eight or more shock absorbers have been used per bogie, in certain cases six per bogie has been enough. The object of the present invention is to effect a further reduction of the number of shock absorbers while, of course, maintaining satisfactory shock absorbing properties.

SUMMARY OF THE INVENTION

The invention is characterised in that for each bogie there are only four shock absorbers to damp the carriage and bogie movements and that these are placed on both sides of the longitudinal and transverse axes of the bogie at a relatively great distance at least from the transverse axis, preferably also from the longitudinal axis, and in a manner known per se directed obliquely relation to the horizontal plane to absorb both vertical and horizontal vibration forces.

The basic idea of the invention is thus to exploit the advantages of the otherwise known oblique arrangement of the shock absorbers in combination with a special new positioning of the shock absorbers in relation to the centre point of the bogie. In this way the number of shock absorbers can be reduced to an absolute minimum, that is, only four.

According to the invention the shock absorbers are placed at an angle of about 45° to the horizontal plane and it has also been found suitable to place the longitudinal axes of the shock absorbers at least substantially in the vertical transverse plane of the rail vehicle.

The distance between the shock absorbers in the longitudinal direction of the vehicle is determined by known calculating methods. Of importance for this distance are the bulk of the bogies, moment of inertia and the bulk of the carriage body. It has been found that for the absorber arrangement according to the invention to give the best possible results, the distance of the shock absorbers from a transverse plane through the centre of the bogie should be greater than or equal to one fourth of the distance between the wheel axles of the bogie. With bogies having more than two axles the distance is calculated between the axles situated nearest each other on either side of the centre point of the bogie.

BRIEF DESCRIPTION OF THE DRAWING

In the following the invention will be described more fully with reference to the accompanying figures where.

DESCRIPTION OF THE PREFERRED EMBODIMENT

Figure 1:
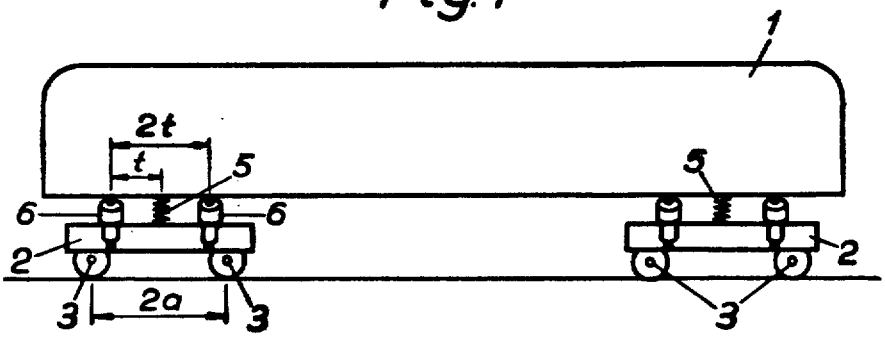
FIG. 1 shows schematically a side view of a railway carriage according to the invention and FIG. 2 an end view of the said carriage.

In the figures, 1 designates a normal railway carriage, preferably a passenger carriage. The carriage is provided with bogies 2, each having two wheel axles 3. The bogies can be turned and swung to a limited extent and are connected to the carriage body 1 by a number of spring elements 5 and four shock absorbers 6. The shock absorbers in the figure are somewhat exaggerated in size. The springs 5 in longitudinal direction are placed approximately centrally on the bogies and one spring element is arranged on each side of the bogie near its outer side. The distance between the springs in transverse direction of the carriage is therefore great, thus counteracting sideways movements of the carriage body. In some carriage types the bogie may be controlled in relation to the carriage body by a handle arranged in the centre of the bogie. The invention can equally well be used for carriages of this type.

Figure 2:
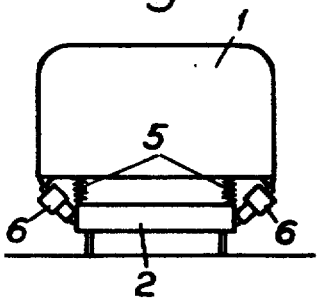

The distance between the wheel axles in a bogie is indicated in the figure as 2a. The distance between the shock absorbers in longitudinal direction of the carriage is indicated as 2t. According to the invention, t should be greater than or equal to 0.5a in order to obtain favourable shock absorbing properties. The distance of the shock absorbers from each other in the sideways direction is of less importance, but for practical reasons it is usually most convenient to place them at the sides of the bogies as shown in FIG. 2. The desired slant of about 45° is then automatically attained if the upper ends of the shock absorbers are connected to the carriage body near its outer edges. In the shown embodiment the shock absorbers slant only in the vertical transverse plane of the carriage, but not in the longitudinal direction of the carriage. The absorbers may, however, be otherwise directed.

The invention is not limited to the shown embodiment, but several variations and modifications are feasible within the scope of the following claim.

I claim:

1. Rail vehicle comprising a carriage body supported by wheel bogies limited for turning and swinging and having several axles, in which between the carriage body and the wheel bogies a number of shock absorbers is arranged to damp the relative movements between carriage body and bogies, characterized in that for each bogie there are only four movement damping shock absorbers placed on both sides of the longitudinal and transverse axes of the bogie at a relatively great distance at least from the transverse axis, directed obliquely in relation to the horizontal plane to absorb both vertical and horizontal vibration forces, the longitudinal axes of the shock absorbers at least substantially coinciding with the vertical transverse plane of the rail vehicle, the distance of the shock absorbers from a transverse vertical plane through the center of the bogie being greater than or equal to one fourth of the distance between the two innermost wheel axles of the bogie.

* * * * *